United States Patent
Kumar et al.

(10) Patent No.: US 10,403,040 B2
(45) Date of Patent: Sep. 3, 2019

(54) VECTOR GRAPHICS RENDERING TECHNIQUES

(71) Applicant: Adobe Inc., San Jose, CA (US)

(72) Inventors: Harish Kumar, Noida (IN); Anmol Sud, Paschim Vihar (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/651,753

(22) Filed: Jul. 17, 2017

(65) Prior Publication Data

US 2019/0019333 A1 Jan. 17, 2019

(51) Int. Cl.
*G06T 15/40* (2011.01)
*G06T 17/20* (2006.01)
*G06T 19/20* (2011.01)
*G06T 17/00* (2006.01)
*G06T 15/02* (2011.01)

(52) U.S. Cl.
CPC .............. *G06T 17/20* (2013.01); *G06T 15/02* (2013.01); *G06T 15/405* (2013.01); *G06T 17/005* (2013.01); *G06T 19/20* (2013.01); *G06T 2215/16* (2013.01); *G06T 2219/2016* (2013.01)

(58) Field of Classification Search
CPC ..... G06T 15/405; G06T 15/40; G06T 15/005; G06T 15/503; G09G 5/393
USPC .......................................................... 345/422
See application file for complete search history.

(56) References Cited

U.S. PATENT DOCUMENTS

| 5,455,599 A * | 10/1995 | Cabral .................... G06T 17/00 345/418 |
| 2004/0114814 A1* | 6/2004 | Boliek ............... G06K 9/00463 382/233 |
| 2013/0120381 A1* | 5/2013 | Lau ........................ G06T 15/04 345/423 |

* cited by examiner

Primary Examiner — Gordon G Liu
(74) Attorney, Agent, or Firm — SBMC

(57) ABSTRACT

Vector graphics rendering techniques are described. Graphics processing units (GPUs) can render vector graphics images according to graphic trees having graphic leafs, each representing a graphics object (e.g., a shape) depicted in a vector graphics image. The described techniques involve generating groups of graphics objects depicted in an image such that graphics objects of a group have a same object type, e.g., shape. Transformations are determined that describe how to transform a first graphics object of a group to obtain other graphics objects of the group. The first graphics object is tessellated and a metadata buffer generated for the group having information indicative of the transformations. The metadata buffer is attached to a graphic leaf representing the first graphics object and graphic leafs representing the other graphics objects are removed from the graphic tree. The GPU renders objects by group based on the tessellated object and the metadata buffer's information.

20 Claims, 9 Drawing Sheets

VECTOR GRAPHICS RENDERING TECHNIQUES

BACKGROUND

In the context of computer graphics, images may be described in a variety of different formats. For instance, images may be described according to vector graphics, which involves using shapes such as polygons to represent the images. In contrast, raster images are described with reference to a grid of pixels or points of color. These different types of image formats may be rendered for display according to specific rendering workflows. In general, these workflows are designed to render images at suitable frame rates. In connection with a drawing application, for instance, the suitable frame rate may be relatively high so that when a user modifies an image, the modifications can be displayed substantially in real-time, e.g., as the user makes the modifications. As more content becomes digitized (e.g., due to content creators creating visual works using drawing applications rather than physical mediums, conversion of physical works to digital versions, and so on) and as display densities continue to increase (e.g., by filling a same area of a display device with increasingly more pixels), the ability to render images at suitable frame rates may become paramount.

Some conventional rendering workflows for rendering vector graphics images involve traversing a graphic tree representative of the images. These trees may include graphic groups and graphic leafs, where each leaf represents an object such as a path, text, or a shape, and where each graphic group is a logical grouping of graphic leafs and may define attributes such as transparency, clipping, blending, and so forth. Conventional vector-graphic rendering workflows can involve reducing the number of graphic leafs corresponding to an image by combining batches of similar graphic leafs (e.g., those that represent opaque and constant-colored paths) into a single, batch leaf. Batching in this way may be effective to reduce an execution time for a graphics processing unit (GPU) employed to render the image. Nonetheless, other portions of these conventional rendering workflows may consume significant computing resources, e.g., in terms of processing time and memory. This can hamper the ability of images to be rendered at a suitable frame rate for some applications.

SUMMARY

To overcome these problems, vector graphics rendering techniques are leveraged. Graphics processing units (GPUs) can render vector graphics images according to rendering orders indicated by graphic trees that include graphic leafs, which each represent a graphics object (e.g., a shape) depicted in a vector graphics image. The described techniques involve a central processing unit (CPU) reducing the number of graphic leafs of these graphic trees before passing them to the GPU for rendering. To reduce the number of leafs, groups of graphics objects depicted in an image are generated such that the graphics objects of a group have a same object type, e.g., a same shape. Transformations are determined for the graphics objects of the group and describe how to transform a first graphics object of the group to obtain the other graphics objects of the group. The first graphics object of the group is tessellated and a metadata buffer for the group is generated that includes information indicative of the determined transformations. The metadata buffer is attached to a graphic leaf representing the first graphics object and the graphic leafs representing the other graphics objects of the group are removed from the graphic tree. The GPU renders each object of a group based on its single tessellated object and the information included in the metadata buffer.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
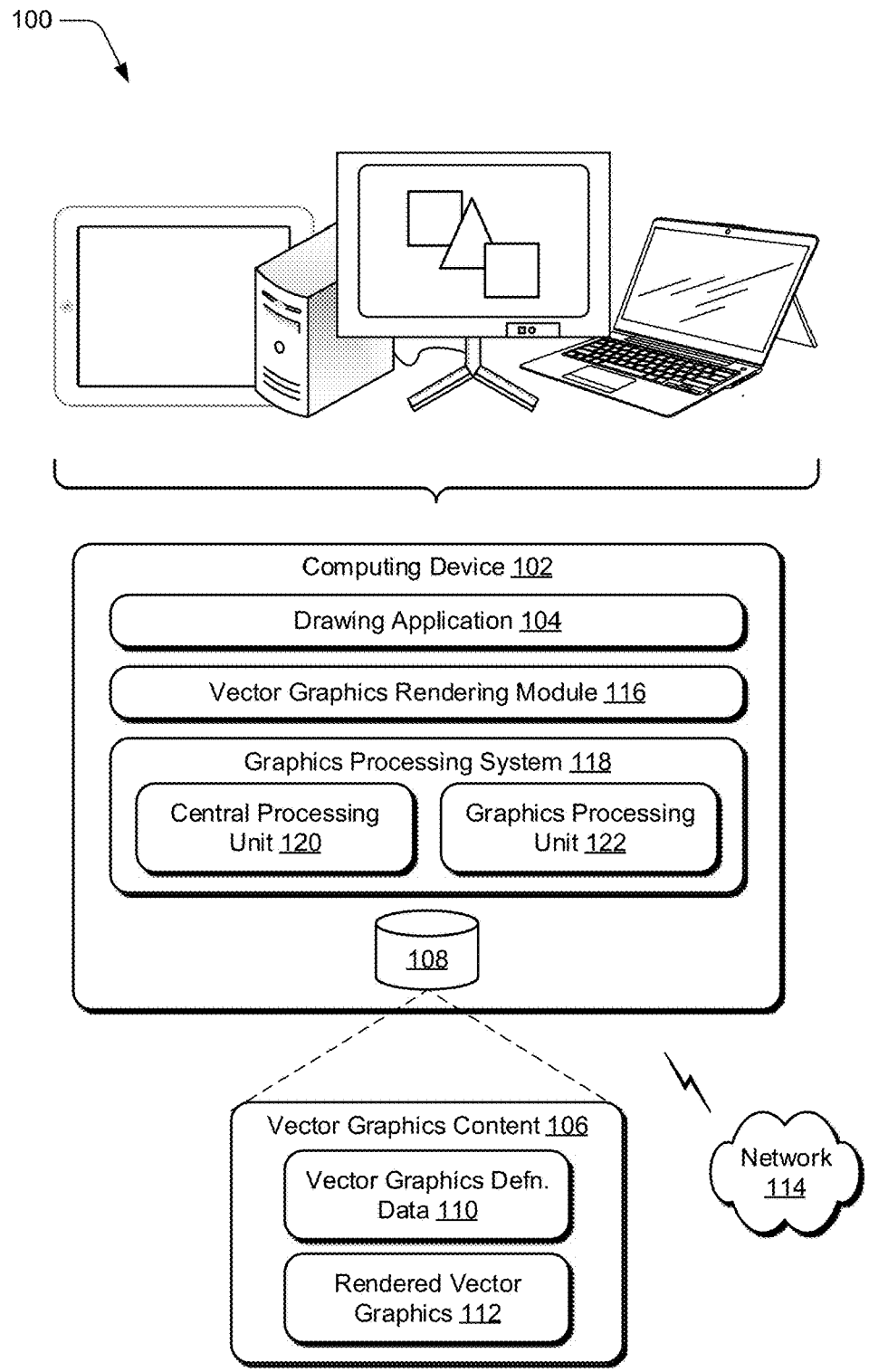
FIG. 1 is an illustration of an environment in an example implementation that is operable to employ techniques described herein.

Some conventional rendering workflows for rendering vector graphics images involve traversing a graphic tree representative of the images. These trees may include graphic groups and graphic leafs, where each leaf represents an object such as a path, text, or a shape, and where each graphic group is a logical grouping of graphic leafs and may define attributes such as transparency, clipping, blending, and so forth. Conventional vector-graphic rendering workflows can involve reducing the number of graphic leafs corresponding to an image by combining batches of similar graphic leafs (e.g., those that represent opaque and constant-colored paths) into a single, batch leaf. Batching in this way may be effective to reduce an execution time for a graphics processing unit (GPU) employed to render the image. Nonetheless, other portions of these conventional rendering workflows may consume significant computing resources, e.g., in terms of processing time and memory. This can hamper the ability of images to be rendered at a suitable frame rate for some applications.

To overcome these problems, vector graphics rendering techniques are leveraged in a digital medium environment. In one or more implementations, the batches generated are further processed to reduce an amount of data passed to the GPU for rendering. In particular, this further processing involves reducing the number of graphic leafs of these graphics trees before passing them to the GPU. To reduce the number of graphic leafs, a central processing unit (CPU) groups the graphics objects depicted in an image. The graphics objects are grouped such that the graphics objects of an individual group each have a same object type, e.g., a same shape, a same line type, a same point, and so on. For instance, a first group of graphics objects may include multiple squares depicted in an image being rendered and a second group of graphics objects may include multiple circles depicted in the image. The object type of a particular graphics object may be determined based on an object type attribute included in a data structure that implements the particular graphics object. In any case, the graphics objects of an image being rendered are grouped on a per-type basis. Further, the graphics objects may also be grouped on a per-batch basis, such that solely the graphics objects in a batch are grouped together, e.g., a square of a first batch is grouped with another square of the first batch, but not with squares of a second batch. Accordingly, groups of a same type of graphics object may be generated for different batches, e.g., a first group of squares may be generated for a first batch and a second group of different squares generated for a second batch.

For each group of graphics objects, a single tessellated object and a metadata buffer are generated. The single tessellated object may correspond to a first encountered graphic leaf that represents a graphics object in the respective group, where the graphic leaf is encountered as part of iterating through the graphic tree. The metadata buffer for a group is attached to the graphic leaf representing the first encountered graphics object of the group. The graphic leafs representing the other graphics objects of the group are removed from the graphic tree. With respect to the contents of the metadata buffer, it includes information indicative of transformations that describe how to obtain the other graphics objects of the group from the first encountered graphics object. In particular, the information describes affine transformations that can be applied to the first encountered graphics object of a group to obtain the other graphics objects of the group. In one or more implementations, the information includes, for each object, x- and y-coordinates for vertices of the object and a depth (e.g., Z-order) of the object. The tessellated shapes and metadata buffers are then provided to the GPU to render an image—rather than providing a graphics tree having merely graphic leafs that each represent an individual graphics object of the image. Additionally, by providing the metadata buffer with a single tessellated graphics object for a group, the amount of data passed to the GPU can be reduced relative to techniques that tessellate each of the objects.

Given rendering data in this way, though, the GPU renders the graphics objects on a type-basis, e.g. such that the graphics objects of one type are rendered before graphics objects of another type. Due to this grouping, however, the rendering order may be changed from a rendering order indicated by the graphic tree, e.g., because information of subsequent graphics objects to be rendered (according to the original graphic tree) is attached to the graphic leaf representing a first of the objects. If the image is simply rendered according to the order of the updated graphic tree (e.g., with attached metadata buffers and removed graphic leafs), some subsequently rendered objects may overlap already rendered objects—although a content creator intended the already rendered objects to overlap the subsequent objects. To resolve this, the GPU utilizes depth values included with the metadata buffers. These depth values indicate a depth (e.g., a Z-order) of each graphics object of an image relative to each other graphics object of the image, and may be determined initially as part of forming batches of the graphics objects.

Given this, when rendering a current graphics object the GPU may compare its depth value to the depth values of the previously rendered graphics objects. If the depth value indicates that the current object is overlapped by a previously rendered object, the GPU determines a portion of the current object overlapped by the previously rendered object. This portion of the current object is discarded and the GPU renders the current object without the overlapped portion. In so doing, the current object may appear to be rendered at a correct depth—in accordance with the original image. By rendering images in this way, not only may an amount of data passed from a CPU to a GPU be reduced, but an amount of time it takes to render a frame can also be reduced. This is due, at least in part, to reducing a number of tessellations generated by CPUs which are then passed to GPUs for image rendering.

Term Descriptions

As used herein, a "graphics object" is any of a variety items depicted in an image. Graphics objects can include points, lines, basic shapes (e.g., rectangles, squares, ellipses, circles, triangles, and so on), user-defined shapes (e.g., by drawing and connecting a series of lines), and so forth. Each of these graphics objects can also have a variety of different attributes, such as color, transparency, fill type (e.g., solid, gradient, pattern, texture, and so on), depth relative to other objects (e.g., in front of or behind), whether the objects cast shadows, and so forth. Users may be able to modify these attributes as well as other characteristics of the graphics objects (e.g., size) via a drawing application.

As used herein, an "affine transformation" refers to a function between affine spaces which preserves points, straight lines, and planes and also preserves ratios of distances between points lying on a straight line. Examples of affine transformation include one or more of translation, scaling, homothety, similarity transformation, reflection, rotation, and shear mapping.

As used herein, the term "tessellating" refers to an act of dividing polygons presenting objects in a scene into suitable structures for rendering, such as into a triangle mesh. Accordingly, a "tessellation" refers to data representing a polygon of an image that has been divided in this way. A rectangle depicted in an image, for instance, may be tessellated into two triangles, each having three vertices.

As used herein, the term "vector graphics" refers to data formats used to describe objects depicted in images with shapes such as polygons to represent the images. In contrast, raster images (e.g., bitmaps) are defined on a per-pixel basis, such that each pixel of an image is associated with color information.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 9.

The computing device 102 is illustrated as including a drawing application 104. The drawing application 104 represents functionality of the computing device 102 to create images, including vector graphics images. To create images, the drawing application 104 may include a suite of tools, such as tools that enable users create and arrange a variety of objects including points, lines, basic shapes (e.g., rectangles, squares, ellipses, circles, triangles, and so on), user-defined shapes (e.g., by drawing and connecting a series of lines), and so forth. The drawing application 104 may also include functionality that allows users to change the attributes of these objects, such as the objects' color, transparency, fill type (e.g., solid, gradient, pattern, texture, and so on), depth relative to other objects (e.g., in front of or behind), whether the objects cast shadows, and so forth.

In one or more implementations, the drawing application 104 presents a user interface for display that allows a user to select such tools. The user interface also includes a workspace where the user can create images by leveraging the tools. This portion of the user interface presents objects that are created, arranged, and modified by the user. Further, using the techniques described herein the objects may be presented in the workspace as they are being created. Consider an example in which a user selects a tool for creating a square in an image. Using the techniques described herein, the user can position a representation of the square in the image and then drag a corner of the square to resize it, such that the user can view these adjustments as they are being made. Further, the drawing application 104 is configured to define images using a vector graphics representation in which polygons are used to represent images. In general, vector graphics are based on vectors, which lead through locations called control points or nodes. These points have definite positions on x- and y-axes of a work plane (at least part of which is presented via the workspace of the user interface).

The computing device 102 also includes vector graphics content 106, which is illustrated as maintained in storage 108 of the computing device 102. The vector graphics content 106 can include vector graphics definition data 110 and rendered vector graphics 112. In general, the vector graphics definition data 110 represents data for defining the variety of vector graphics objects (e.g., shapes) included in the vector graphics images maintained by the computing device 102. Consequently, the vector graphics definition data 110 may represent one or more vector graphics images. With respect to defining vector graphics objects, consider an example in which the vector graphics definition data 110 defines a square of a vector graphics image. The square can be defined using values indicative of x- and y-coordinate positions of the square's corners (configured as control points of the square), where the coordinate positions are included in a coordinate plane that corresponds to the example vector graphics image. Vector graphics images contrast with raster images (e.g., bitmaps) which are defined on a per-pixel basis, such that each pixel of an image is associated with color information.

The rendered vector graphics 112 represents vector graphics images or portions of vector graphics images that have been rendered. By way of example, a portion of the vector graphics definition data 110 that defines an image being created via the drawing application 104 may be rendered to form rendered vector graphics 112. The rendered vector graphics 112 may be rendered for display, printing, and so on. Once rendered, the rendered vector graphics 112 may be presented via a display of the computing device 102, e.g., in a workspace portion of the drawing application 104's graphical user interface. Although shown as part of the computing device 102, the vector graphics definition data 110 and the rendered vector graphics 112 may be maintained on other computing devices, such as remote computing devices that are accessible to the computing device 102 over network 114. In one or more scenarios, the computing device 102 may simply obtain a file of the vector graphics definition data 110 and generate the rendered vector graphics 112 from the file, e.g., without a user of the computing device 102 creating a vector graphics image via a drawing application of the computing device 102.

The computing device 102 is also illustrated including vector graphics rendering module 116 and graphics processing system 118. The illustrated vector graphics rendering module 116 and graphics processing system 118 are implemented at least partially in hardware of the computing device 102 to process and transform the vector graphics definition data 110. Such processing can include rendering the vector graphics definition data 110 to produce the rendered vector graphics 112, e.g., for display by a display device of the computing device 102 or for printing by a printer associated with the computing device 102. Although illustrated as implemented locally at the computing device 102, functionality of the illustrated vector graphics rendering module 116 and the graphics processing system 118 may also be implemented in whole or part via functionality available via the network 114, such as part of a web service or "in the cloud."

Examples of functionality incorporated by the illustrated vector graphics rendering module 116 include controlling rendering of the vector graphics definition data 110 to generate rendered vector graphics 112 according to the described techniques. In particular, the vector graphics rendering module 116 represents functionality to direct central processing unit 120 (CPU 120) and graphics processing unit 122 (GPU 122) to perform different portions of a vector graphics rendering workflow. The rendering workflow includes the CPU 120 processing the vector graphics definition data 110 of a particular image (e.g., a graphic tree associated with the image) to batch similar objects together based on predefined rules.

In contrast to conventional vector graphics rendering techniques, the vector graphics rendering module 116 also directs the CPU 120 to determine the objects in each batch that are the same, e.g., determine each object of a batch having a same shape. For each of the objects having a same shape, the vector graphics rendering module 116 directs the CPU 120 to determine a transformation (e.g., rotation, translation, scaling) from an initial one of the objects (e.g., a first of the same-shaped objects traversed in the graphics tree). Based on this, the vector graphics rendering module 116 directs the CPU 120 to generate a metadata buffer for each same-shape group. These metadata buffers are generated to include information indicative of the determined transformations. The initial object and the metadata buffer are then passed to the GPU 122 for rendering, e.g., to generate the rendered vector graphics 112. Operation of the vector graphics rendering module 116 and the graphics processing system 118 is described in greater detail in relation to FIG. 2 in the following description and with the example renderings of FIGS. 4 and 5.

Vector Graphics Rendering Techniques

Figure 2:
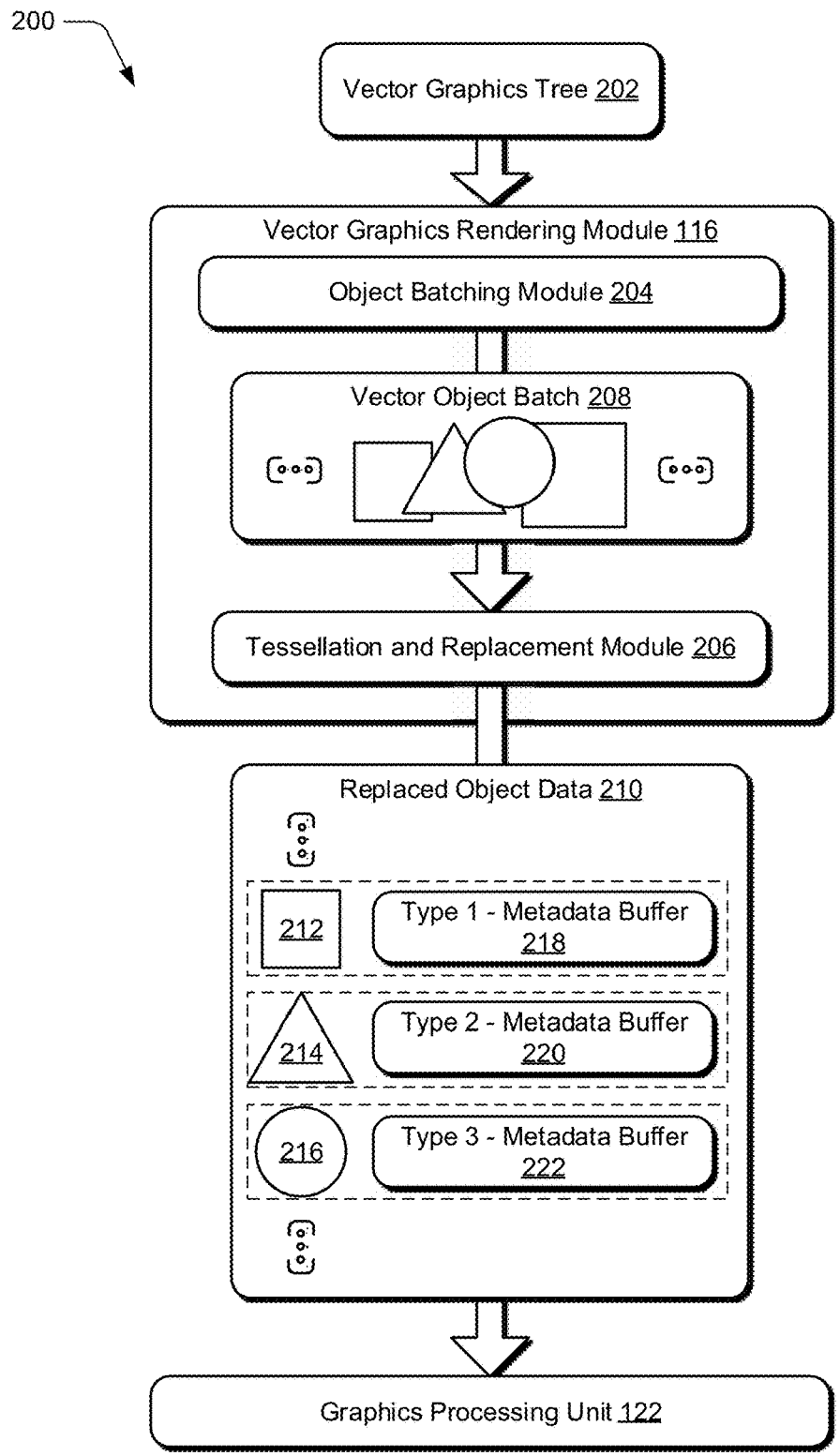
FIG. 2 depicts an example implementation in which a vector graphics rendering module of FIG. 1 transforms information representative of a vector graphics image using a central processing unit and provides the transformed information to a graphics processing unit.

FIG. 2 depicts a system 200 in an example implementation in which a vector graphics rendering module of FIG. 1 transforms information representative of a vector graphics image using a central processing unit and provides the transformed information to a graphics processing unit. The illustrated system 200 includes the vector graphics rendering module 116 and the GPU 122 of FIG. 1.

The vector graphics rendering module 116 is depicted obtaining vector graphics tree 202. The vector graphics tree 202 is an example of the vector graphics definition data 110 and may correspond to a vector graphic image that is to be rendered, e.g., for display, printing, and so on. Broadly speaking, the vector graphics tree 202 may be configured such that it comprises graphic groups and graphic leafs, where each leaf represents a vector object such as a path, text, or a shape, and where each graphic group is a logical grouping of graphic leafs and may define attributes such as transparency, clipping, blending, and so forth. In the vector graphics definition data 110, each vector object may be associated with a label, such as a string of text indicative of the object. By way of example, a square of a vector graphic image may be associated with the label 'SQUARE' as well as other data values indicative of other attributes, e.g., location, size, color, and so forth. This information and other information may be used to form the vector graphics tree 202 for rendering the corresponding vector graphics image.

In the illustrated example, the vector graphics rendering module 116 is depicted with object batching module 204 and tessellation and replacement module 206. In general, the functionality of the vector graphics rendering module 116 may be carried out by leveraging the CPU 120. The object batching module 204 represents functionality of the vector graphics rendering module 116 to traverse the vector graphics tree 202 and generate batches of graphic leafs according to predefined rules. One such rule may indicate to batch graphic leafs of the vector graphics tree 202 that represent opaque and constant-colored paths, e.g., graphic leafs that represent objects having a gradient fill or having any amount of transparency are not included in this batch. By batching the graphic leafs in this way, a number of draw calls made to the GPU 122 may be reduced. The object batching module 204 may generate batches by processing the vector graphics tree 202 according to a variety of different graphics-batching techniques without departing from the techniques described herein.

In any case, the object batching module 204 is configured to generate vector object batch 208 based on the batching. The vector object batch 208 is depicted with ellipses to illustrate that by traversing the vector graphics tree 202, the object batching module 204 may produce multiple batches of graphic leafs. In general, the object batching module 204 forms these batches by grouping the graphic leafs of multiple similar objects—as defined by the predefined rules. Some objects represented by the vector graphics tree 202 may not be batched, however. This can be because there are no other similar objects according to the predefined rules or because the predefined rules do not indicate to batch leafs of some objects, e.g., objects having a gradient fill, objects having a degree of transparency, and so forth. In some rendering techniques, each of the objects in a batch is tessellated on a CPU and then rendered in a single drawing call to a GPU. In contrast to such techniques, the described techniques further process the generated vector object batch 208 so that the CPU 120 generates one tessellation for a group of repeated objects in a batch rather than tessellate each of the objects.

The tessellation and replacement module 206 represents functionality of the vector graphics rendering module 116 to further process the vector object batch 208. This further processing involves the tessellation and replacement module 206 determining repeated objects in the vector object batch 208. For example, the tessellation and replacement module 206 can process the vector object batch 208 to determine each of multiple squares in the vector object batch 208. In accordance with the described techniques, a vector object in the vector object batch 208 may be considered a repeat if the vector object is an affine transformation of an object already encountered in the vector object batch 208. Continuing with the square example, squares in the vector object batch 208 may be considered repeats of an initially-encountered square despite differences in scaling, translation, rotation, and so on.

Affine transformations may include differences with an initially encountered object in one or more of translation, scaling, homothety, similarity transformation, reflection, rotation, and shear mapping. Repeated objects in a batch may also have other different attributes, such as different colors. For example, the tessellation and replacement module 206 is configured to determine that a green square and a red square included in a same batch are repeated objects.

Based on determining the repeated objects, the tessellation and replacement module 206 replaces each group of repeated objects with a single object for tessellation and a metadata buffer. In connection with this, the tessellation and replacement module 206 may remove the graphic leafs representing the repeated objects from the vector graphics tree 202. Further, the tessellation and replacement module 206 may replace a graphic leaf that represents a first encountered instance of a grouped object with data indicative of that single object and a memory buffer for the other determined instances of the object, e.g., the repeated instances of the object.

Replaced object data 210 represents data generated by the tessellation and replacement module 206 that is capable of replacing the graphic leafs for a group of repeated objects in the vector graphics tree 202. The replaced object data 210 includes for each group of repeated objects, a single object and a corresponding metadata buffer. In the illustrated example 200, the replaced object data 210 includes single objects 212, 214, 216 and corresponding metadata buffers, including type 1—metadata buffer 218, type 2—metadata buffer 220, and type 3—metadata buffer 222. The replaced object data 210 is illustrated with ellipses to indicate that there may be more replaced object data for the vector graphics image represented by the vector graphics tree 202. For instance, there may be replaced object data for other vector object batches determined for the vector graphics tree 202. It is to be appreciated that the vector object batch 208 and the replaced object data 210 are merely examples to aid in explaining the described techniques. Indeed, a given vector object batch may include more, fewer, and different types of single objects than those depicted (e.g., different than the single objects 212, 214, 216) without departing from the spirit or scope of the techniques described herein.

Regardless, each of the depicted metadata buffers represents data describing how repeated instances of the object under consideration are different from the single object. In particular, the single objects are tessellated instances of the objects (e.g., tessellated by the CPU 120), and the metadata buffers describe the affine transformations to obtain the determined repeated objects from the single objects. Consider the single object 212, in accordance with one or more implementations. In the illustrated example, the single object 212 is depicted as a square and thus represents a square of the vector object batch 208 as tessellated by the CPU 120. Further, the type 1—metadata buffer 218 represents data indicative of other squares of the vector object batch 208. In particular, the type 1—metadata buffer 218 represents affine transformations that can be applied to the square single object 212 to produce the other squares of the vector object batch 208. In other words, the type 1—metadata buffer 218 indicates how the tessellated instance of the square can be scaled, translated, rotated, and so on, to produce the other squares of the vector object batch 208. Similarly, the type 2—metadata buffer 220 represents information describing one or more affine transformations that can be applied to the single object 214 to produce repeated instances of the single object 214, and the type 3—metadata buffer 222 represents information describing one or more affine transformations that can be applied to the single object 216 to produce repeated instances of the single object 216. In this context, consider FIG. 3.

Figure 3:
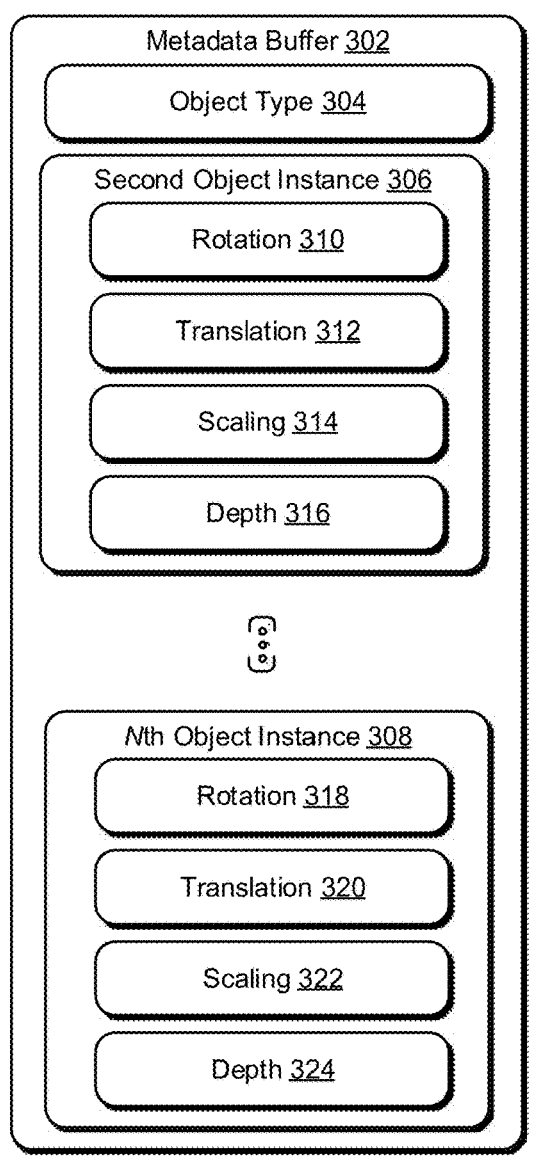
FIG. 3 depicts an example implementation of a metadata buffer used to store information for rendering, from a single image object, repeated similar objects in a vector graphics image.

FIG. 3 illustrates an example 300 of a metadata buffer used to store information for rendering, from a single vector image object, repeated similar vector image objects in a vector graphics image.

The illustrated example 300 depicts metadata buffer 302. In the context of FIG. 2, the metadata buffer 302 may correspond to the type 1—metadata buffer 218, the type 2—metadata buffer 220, or the type 3—metadata buffer 222. In accordance with the described techniques, the metadata buffer 302 is generally provided along with a tessellated vector graphics object to the GPU 122. This enables the GPU 122 to render multiple instances of a particular type of shape and reduces a number of drawing calls issued to the GPU 122 for rendering a vector graphics image. The illustrated metadata buffer 302 includes object type 304, second object instance 306, and $N^{th}$ object instance 308.

The object type 304 represents data that identifies the type of object for which the metadata buffer 302 is generated. By way of example, the object type 304 may be a label that is indicative of the single object provided with the metadata buffer 302 as well as the objects represented by the data in the metadata buffer 302. For instance, the shape label may be a string, such as 'SQUARE', 'CIRCLE', 'STRAIGHT LINE', 'USER_CREATED_SHAPE_19842305', and so forth. The object type 304 may identify the type of object in a variety of other ways without departing from the spirit or the scope of the techniques described herein. The object type 304 may be a universally unique identifier (UUID) that correspond to the type of object or may be a pointer to the single instance of the object provided to the GPU 122 with the metadata buffer 302.

The second object instance 306 represents that there is a second instance of a vector object identified by the object type 304. Consider an example, in which the object type 304 indicates that the metadata buffer 302 is generated for squares. The second object instance 306 represents information corresponding to a second square in a respective batch of vector objects. The $N^{th}$ object instance 308 indicates that there are N instances of the vector object identified by the object type 304. Considering again the square example, the $N^{th}$ object instance 308 represents information corresponding to an $N^{th}$ square (at least a third square) in a respective batch of vector objects.

In accordance with the described techniques, each of the second object instance 306 and the $N^{th}$ object instance 308 includes transformation information, which describes how the indicated instance of the object differs from the single object associated with to the metadata buffer 302. In the illustrated example 300, the second object instance 306 includes rotation 310, translation 312, scaling 314, and depth 316. Similarly, the $N^{th}$ object instance 308 includes rotation 318, translation 320, scaling 322, depth 324. Broadly speaking, the rotation 310 indicates an amount the second object is rotated relative to the single object associated with the metadata buffer 302, the translation 312 indicates an amount the second object is translated relative to the single object, and the scaling 314 indicates an amount the second object is scaled relative to the single object. In a similar fashion, the rotation 318 indicates an amount the $N^{th}$ object is rotated relative to the single object associated with the metadata buffer 302, the translation 320 indicates an amount the $N^{th}$ object is translated relative to the single object, and the scaling 322 indicates an amount the $N^{th}$ object is scaled relative to the single object. The depths 316, 324 represent a depth (e.g., an indication of Z-order) of the second object and the $N^{th}$ object, respectively, in relation to each of the other objects in the respective vector graphics image. In other words, the depths 316, 324 are not merely in relation to the single instance of the object. Rather, depths may be determined by the object batching module 204 for each vector object of a given vector graphics image.

It should be appreciated that the metadata buffer 302 may include more, less, or different information than depicted without departing from the spirit or scope of the techniques described herein. By way of example, the metadata buffer 302 may not include the object type 304 in some implementations. Rather, the metadata buffer may be associated with a single object (e.g., the single objects 212, 214, 216) in a variety of different ways. Further, the number of object instances represented by the metadata buffer 302 is based on a number of the same objects determined by the tessellation and replacement module 206. For instance, if the tessellation and replacement module 206 determines that there are two squares in the vector object batch 208, the metadata buffer 302 may include transformation information for one square, e.g., the second square. The tessellated first square is already provided with the metadata buffer 302 and serves as the basis for producing the second square. If the tessellation and replacement module 206 determines that there are four squares in the vector object batch 208, however, the metadata buffer 302 can include transformation information for three squares. Furthermore, different information describing how to achieve repeated instances of an object from a single, provided object may be included in the metadata buffer 302 without departing from the spirit or scope of the techniques described herein.

In general, providing a single tessellated vector object to the GPU 122 along with a metadata buffer configured as described above and below is effective to reduce a burden on computing resources, e.g., at least in terms of memory used. Consider an example in which a vector graphics image includes 100 rectangle objects. In this example, the tessellation and replacement module 206 may tessellate a single one of the 100 rectangle objects—the tessellation and replacement module 206 generates a metadata buffer that includes transformation information enabling the other 99 rectangles to be reproduced from the single tessellated rectangle. In general, rectangles tessellate to 2 triangles having 6 vertices, which may be represented using 24 bytes of data. Techniques that tessellate each of the 100 rectangles thus provide 2400 bytes of data to the GPU 122. Rather than providing 2400 bytes of data to the GPU 122, leveraging the described techniques in connection with this example may involve providing 1224 bytes of data to the GPU 122—the single rectangle object is represented with 24 bytes of data and the 99 other rectangle objects may be represented using only 12 bytes of data each to describe the x, y transformation and depth of each rectangle. Not only may the described techniques reduce a memory footprint used to render vector graphics images, but the described techniques may also reduce a frame render time relative to techniques that simply batch vector objects according to the predefined rules.

In general, reducing the information passed to the GPU 122 to that described, e.g., a single tessellated object and a metadata buffer for any repeated instances of the object, results in a rendering order in which repeated shapes are rendered together before a next shape. The rendering order may indicate, for instance, that each of the squares in the vector object batch 208 is to be rendered before any of the triangles. In the case of overlapping objects, this rendering order may not preserve the appearance of the original vector graphics image. In this context, consider FIGS. 4 and 5.

Figure 4:
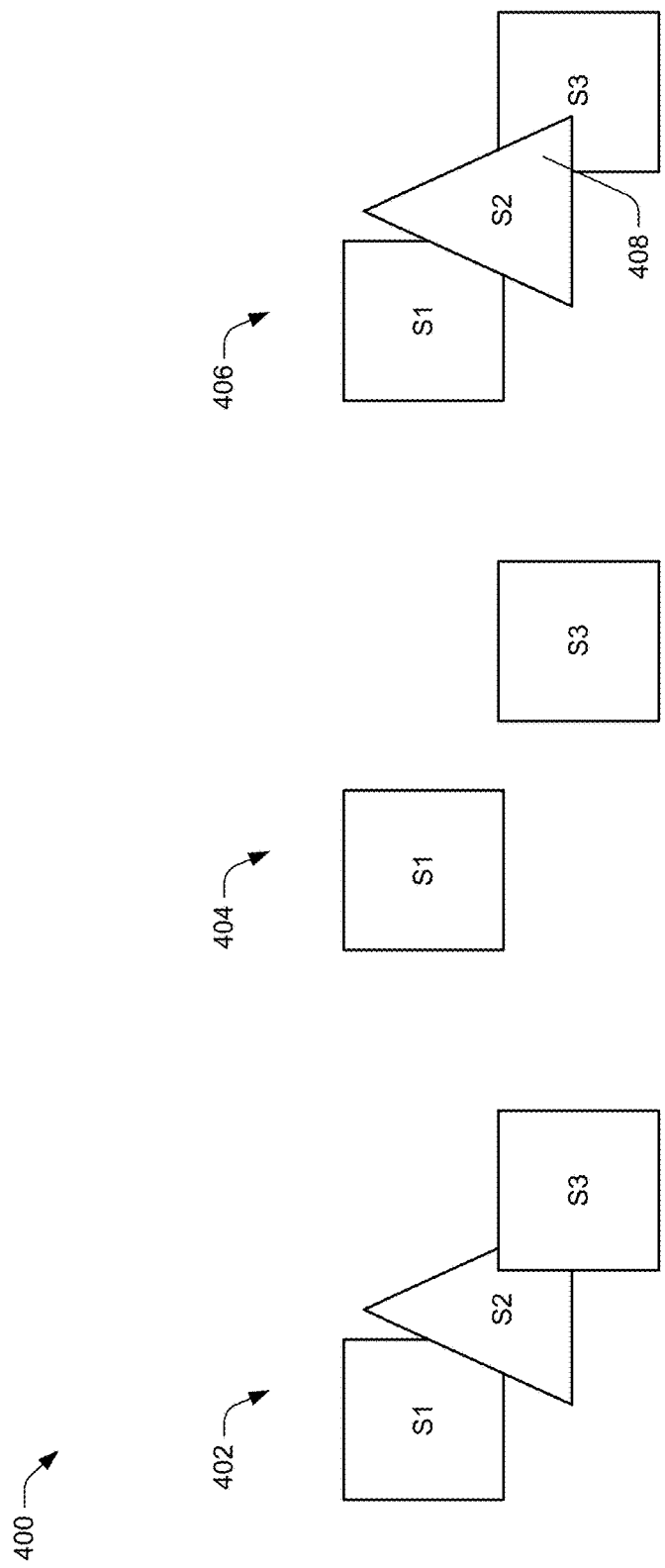
FIG. 4 depicts an example implementation in which objects of a vector graphics image having a similar shape are rendered together before a next group of objects having a different similar shape and in which shape depths as defined by the vector graphics image are not resolved.

FIG. 4 illustrates an example 400 in which objects of a vector graphics image having a similar shape are rendered together before a next group of objects having a different similar shape. In the example 400, however, shape depths as defined by the vector graphics image have not been resolved.

The illustrated example 400 includes original artwork arrangement 402, first draw call result 404, and second draw call result 406. The original artwork arrangement 402 includes three shapes, labeled 'S1,' 'S2,' and 'S3.' In the illustrated example 400, S1 and S2 represent different objects having a same shape (rectangle) and S2 represents a third object having a different shape (triangle). In the original artwork arrangement 402, these shapes are depicted arranged such that S2 is behind S3 and S1 is behind both S2 and S3.

The first draw call result 404 represents the objects that result after each instance of a first type of object, e.g., a rectangle, is rendered. This may correspond to a first draw call to the GPU 122 to render a single tessellated object and the respective repeated objects of a corresponding metadata buffer. In the illustrated example 400, the rectangle S1 and the rectangle S2 are included as part of the first draw call result 404, e.g., due to a scenario where S1 is a single object and is associated with a metadata buffer that describes how to transform S1 to achieve S2. The second draw call result 406 represents the objects that result after each instance of a next type of object, e.g., a triangle, is rendered. Rendering in this way, however, results in the shapes S1, S2, and S3 being drawn in the wrong order. In the second draw call result 406, the triangle S2 overlaps the rectangle S3 at 408, though in the original artwork arrangement 402 the triangle S2 is arranged behind the rectangle S3. In accordance with one or more implementations, this issue is resolved by including a depth resolution technique that utilizes a depth (e.g., Z-order) determined for each object of the vector graphics image, e.g., as part of traversing the vector graphics tree 202 to generate the vector object batches 208. In this context, consider FIG. 5.

Figure 5:
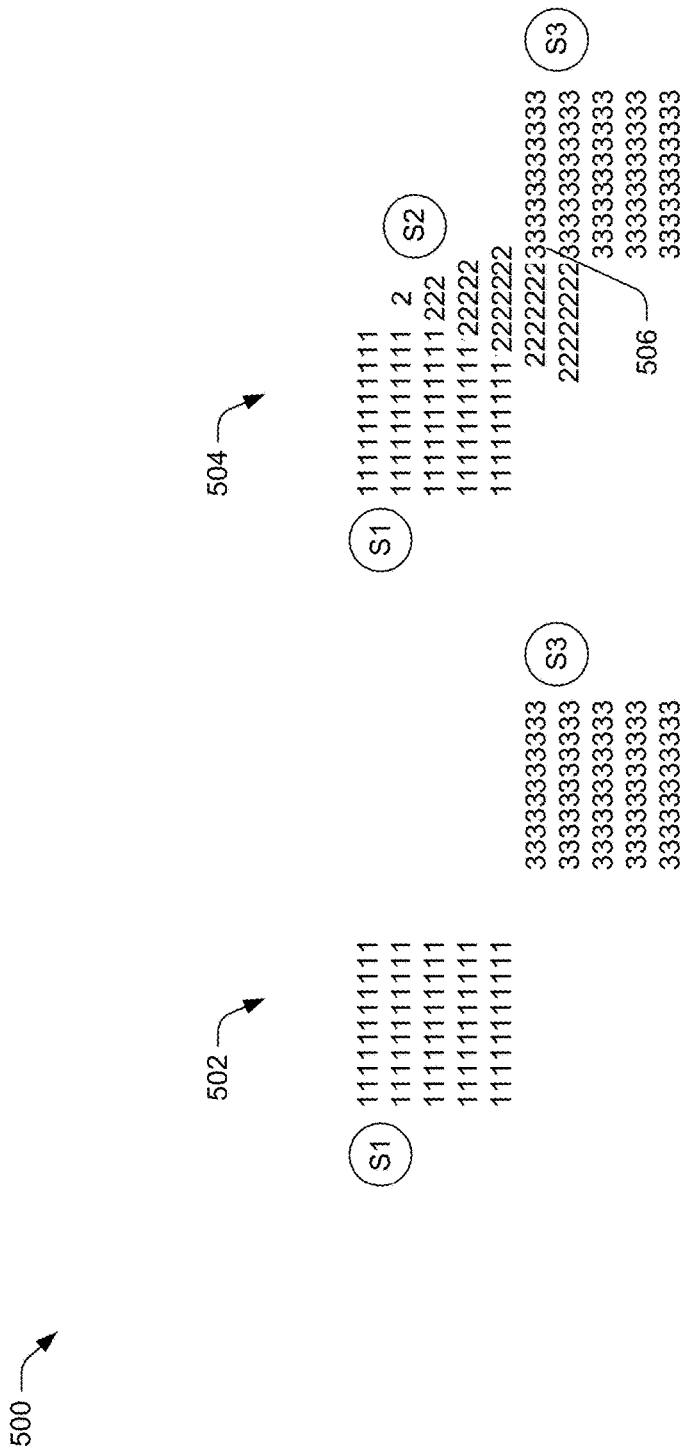
FIG. 5 depicts an example implementation in which objects of a vector graphics image having a similar shape are rendered together before a next group of objects having a different similar shape and in which shape depths as defined by the vector graphics image are resolved.

FIG. 5 illustrates an example 500 in which objects of a vector graphics image having a similar shape are rendered together before a next group of objects having a different similar shape. In the example 500, shape depths as defined by the vector graphics image are resolved with a depth resolution technique.

The illustrated example 500 includes an alternate depiction of the first draw call result 502 and a depth-resolved second draw call result 504. Like the results depicted in FIG. 4, the results of the illustrated example 500 are based on the original artwork arrangement 402. The alternate depiction of the first draw call result 502 corresponds to the first draw call result 404 and represents the objects that result after each instance of a first type of object, e.g., a rectangle, is rendered. Accordingly, the alternate depiction of the first draw call result 502 includes the rectangles labeled S1 and S2. The depth-resolved second draw call result 504 represents the objects that result after each instance of a next type of object, e.g., a triangle, is rendered. In contrast to the example 400, however, the triangle S2 is subject to a depth test in connection with the rendering—the depth test determining whether the Z-order of the triangle S2 is greater than the Z-order of the rectangle S3. Based on the determination that the Z-order of the triangle S2 is not greater than the Z-order of the rectangle S3, the portion of the triangle S2 that overlaps the rectangle S3 is discarded and a remainder of the triangle S2 is rendered. This results in the triangle S2 appearing behind the rectangle S3 at 506, as in the original artwork arrangement 402.

Having discussed example details of the techniques for vector graphics rendering, consider now some example procedures to illustrate additional aspects of the techniques.

Example Procedures

This section describes example procedures for vector graphics rendering techniques in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the computing device 102 of FIG. 1 that makes use of a vector graphics rendering module 116 or the example system 200 of FIG. 2, which also makes use of this module. A suitable device for performing the procedures may also be a service provider accessible to the computing device 102 over the network 114 and having a vector graphics rendering module 116 and a graphics processing system 118.

Figure 6:
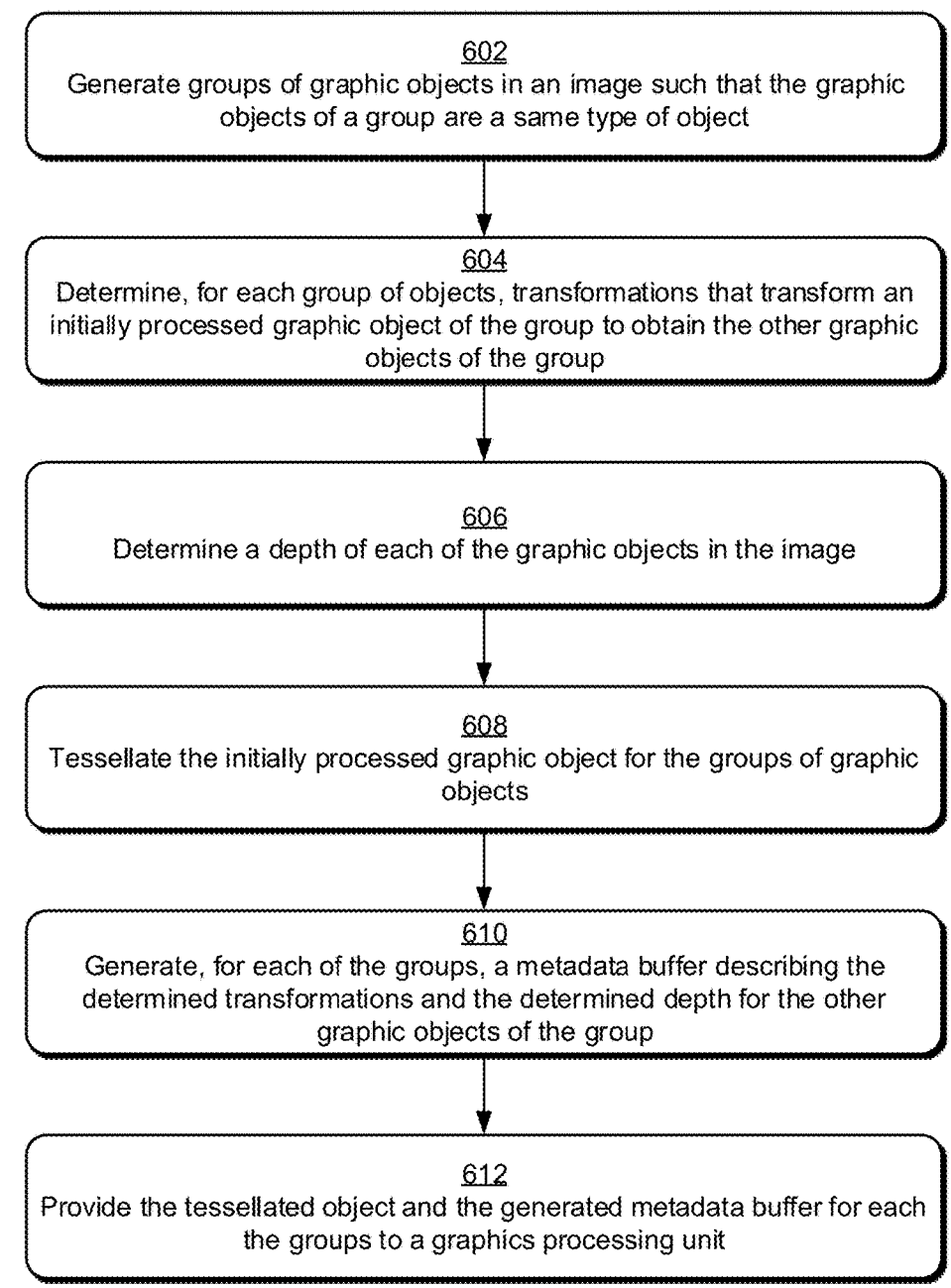
FIG. 6 depicts a procedure in an example implementation in which data describing graphic objects depicted in an image is transformed before being provided to a graphics processing unit for rendering.

FIG. 6 depicts an example procedure 600 in which data describing graphic objects depicted in an image is transformed before being provided to a graphics processing unit for rendering. Groups are generated of graphic objects depicted in an image (block 602). In accordance with the principles discussed herein, the graphic objects are grouped such that the graphic objects in an individual group have a same type. By way of example, the tessellation and replacement module 206 generates groups of graphic objects depicted in an image. The graphic objects each of these individual groups have a same type. In one or more implementations, graphic objects in images are associated with an object type attribute that is indicative of the object, e.g., the object type may correspond to 'RECTANGLE', 'CIRCLE', 'SQUARE', and so on. Accordingly, the tessellation and replacement module 206 can use this attribute as a basis for grouping the graphic objects of an image.

Transformations are determined for each group of objects (block 604). In accordance with the principles discussed herein, the transformations for a particular group are determined for transforming an initially processed graphic object of the group to obtain the other graphic objects of the particular group. By way of example, the tessellation and replacement module 206 determines transformations for each of the groups determined at block 602. With reference to FIG. 2, the tessellation and replacement module 206 determines translations that can be applied to the single object 212 to obtain other objects grouped with the single object 212, e.g., other squares in the vector object batch 208.

A depth is determined for each of the graphic objects in the image (block 606). By way of example, the object batching module 204 determines a depth for each graphic object of an image represented by the vector graphics tree 202. The object batching module 204 determines the depth, for instance, in connection with generating the vector object batch 208. The initially processed graphic object of each group is tessellated (block 608). By way of example, the tessellation and replacement module 206 tessellates the single objects 212, 214, 216, which are associated with a group of squares, a group of triangles, and a group of circles, respectively, in the vector object batch 208.

A metadata buffer is generated for each of the groups (block 610). In accordance with the principles discussed herein, the metadata buffer generated for a particular group describes the determined transformations and the determined depth for the other graphic objects of the particular group. By way of example, the tessellation and replacement module 206 generates the type 1—metadata buffer 218, the type 2—metadata buffer 220, and the type 3—metadata buffer 222. Further, the type 1—metadata buffer 218 describes the transformations determined at block 608 from the single object 212 to other squares in the vector object batch 208. The type 1—metadata buffer 218 also describes depths in the respective image of the other squares.

The tessellated object and the generated buffer are provided to a graphics processing unit for each of the groups (block 612). By way of example, the tessellation and replacement module 206 provides the replaced object data 210 to the graphics processing unit 122 (GPU 122). The replaced object data 210 includes tessellated objects (e.g., the single objects 212, 214, 216) and the respective metadata buffers as illustrated.

Figure 7:
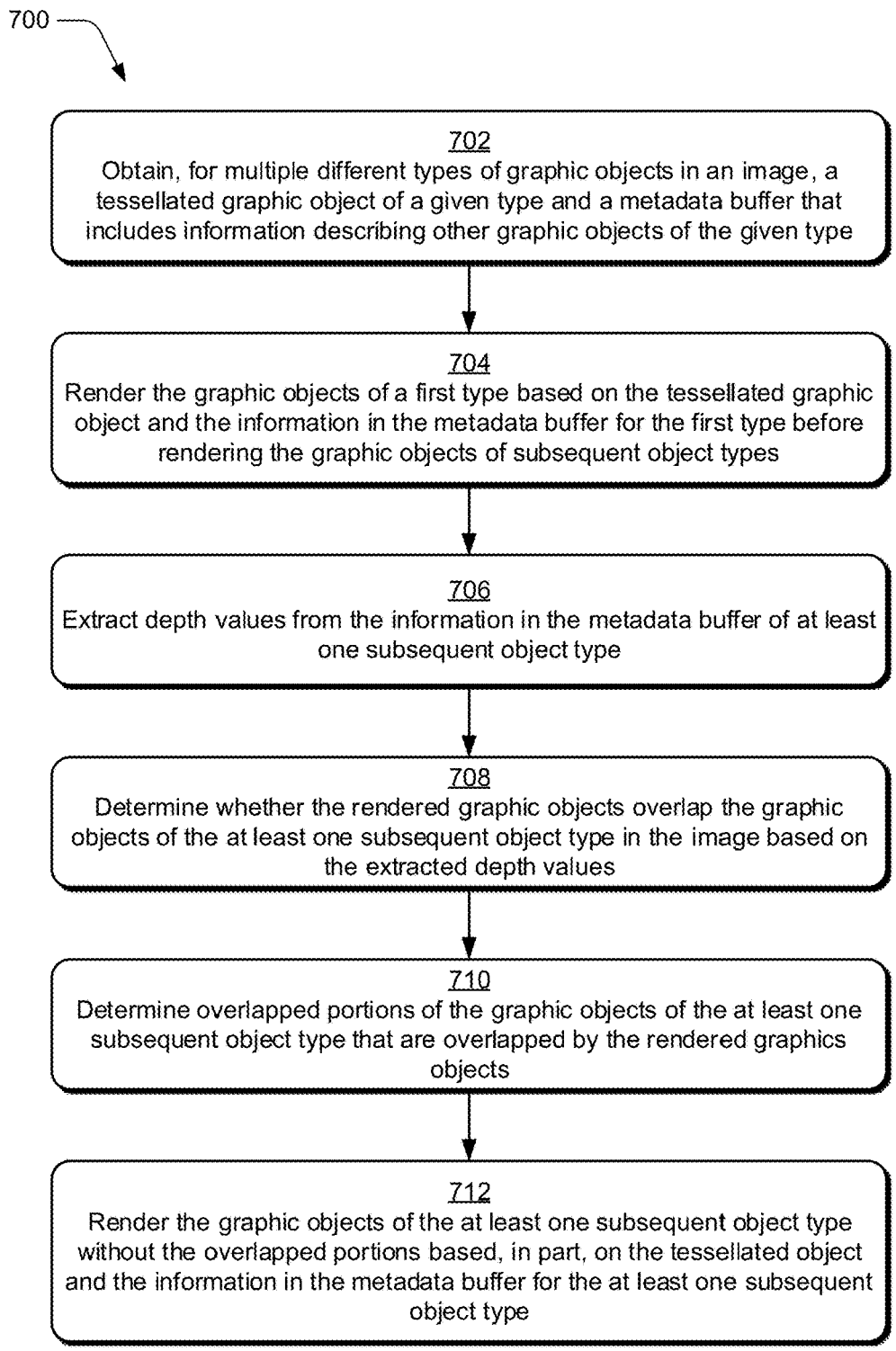
FIG. 7 depicts a procedure in an example implementation in which the graphics processing unit renders the image using the transformed data that describes the graphics objects depicted in the image.

FIG. 7 depicts an example procedure 700 in which the graphics processing unit renders the image using the transformed data that describes the graphics objects depicted in the image.

A tessellated graphic object and a metadata buffer is obtained by a graphics processing unit for each of multiple different types of graphics objects in an image (block 702). In accordance with the principles discussed herein, the metadata buffer corresponding to a particular type of graphics object includes information describing how to obtain from the respective tessellated graphic object other graphic objects of the particular type. By way of example, the GPU 122 obtains the single object 212 and the type 1—metadata buffer 218, the single object 214 and the type 2—metadata buffer 220, and the single object 212 and the type 3—metadata buffer 222. As described in more detail above, these metadata buffers describe how to obtain other graphic objects from the tessellated graphic objects, e.g., using affine transformation information such as the rotation 310, the translation 312, and the scaling 314.

Graphic objects of a first type are rendered based on the tessellated graphic object and the information in the metadata buffer corresponding to the first type (block 704). In accordance with the principles discussed herein, the graphic objects of the first type are rendered before the graphic objects of subsequent object types. By way of example, consider FIGS. 4 and 5. In these examples, shapes S1 and S2 correspond to a first type of graphics object, e.g., a rectangle. Further, the GPU 122 renders shapes S1 and S2 to produce the first draw call result 404. The GPU 122 renders these shapes based on a respective tessellated graphic object (e.g., the single object 212) and information in a respective metadata buffer (e.g., the type 1—metadata buffer 218). In this example, the single object 212 may thus correspond to the shape S1. Moreover, the shapes S1 and S2 are each rendered before a subsequent type of shape, e.g., before triangles such as S2.

Depth values are extracted from the information in the metadata buffer of at least one subsequent object type (block 706). By way of example, the GPU 122 extracts a depth value for the shape S2 from the type 2—metadata buffer 220. In one or more implementations, the depth value corresponds to a Z-value indicative of a graphic object's depth in an image relative to each other graphic object in the image. A determination is made regarding whether the rendered objects overlap the graphic objects of the at least one subsequent object type based on the extracted depth values (block 708). By way of example, the GPU 122 performs a depth test using the depth value extracted at block 706 to determine whether the rendered shapes S1 and S3 overlap shape S2.

Overlapped portions are determined for the graphic objects of the at least one subsequent object type (block 710). By way of example, the GPU 122 determines that the shape S3 overlaps the shape S2 in the image according to the depth test at block 708. This is depicted in the original artwork arrangement 402. Additionally, the GPU 122 determines the portion of the shape S2 that is overlapped in the original artwork arrangement 402 by the shape S3. In one or more implementations, the GPU 122 discards this portion of S2 and produces a fragment of the shape S2 for rendering.

The graphic objects of the at least one subsequent object type are rendered without the overlapped portions (block 712). In accordance with the principles discussed herein, the graphic objects of the at least one subsequent object type are rendered based, in part, on the respective tessellated object and the information in the metadata buffer. By way of example, the GPU 122 renders the shape S2 without the overlapped portion determined at block 710 to produce the depth-resolved second draw call result 504. The GPU 122 renders the shape S2 based, in part, on the respective tessellated object and information in the respective metadata buffer. This results in the GPU 122 producing the rendered vector graphics 112.

Figure 8:
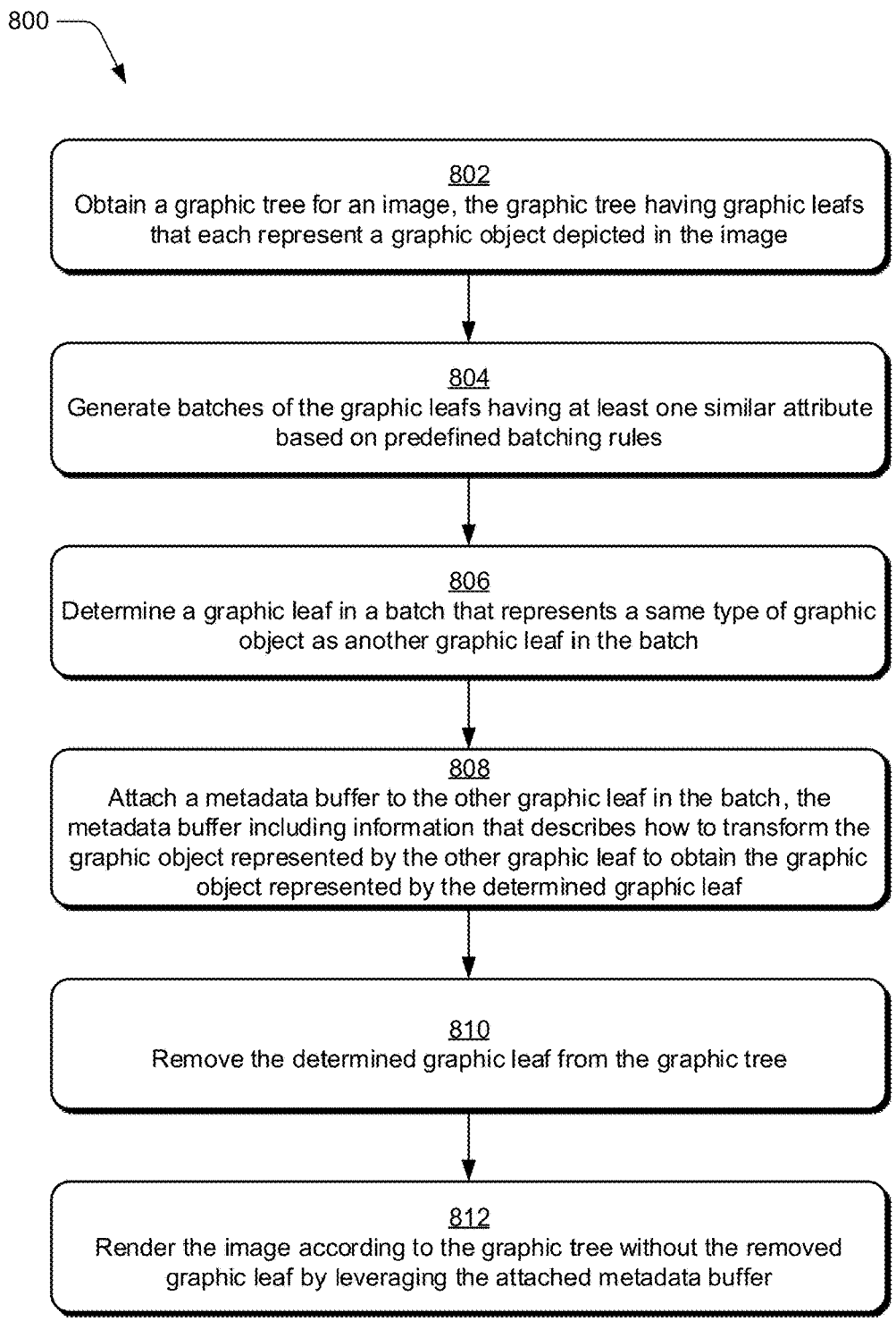
FIG. 8 depicts a procedure in an example implementation in which a graphic tree indicative of a rendering order for graphic objects in an image is transformed to change the rendering order.

FIG. 8 depicts an example procedure 800 in which a graphic tree, indicative of a rendering order for graphic objects in an image, is transformed to change the rendering order.

A graphic tree indicative of a rendering order for graphic objects in an image is obtained (block 802). In accordance with the principles discussed herein, the graphic tree includes graphic leafs that each represent a graphic object depicted in the image. By way of example, the vector graphics rendering module 116 obtains the vector graphics tree 202, which is indicative of a rendering order for graphic objects in an image included as part of the vector graphics definition data 110.

Batches of the graphic leafs are generated (block 804). In accordance with the principles discussed herein, the graphic leafs in a batch have at least one similar attribute and the graphic leafs are batched according to predefined batching rules. By way of example, the object batching module 204 generates the vector object batch 208 according to pre-defined batching rules, such as a predefined rule indicating to create a batch of graphic leafs representing paths that are opaque and constant colored (e.g., that do not have a gradient fill).

A graphic leaf in a batch is determined to represent a same type of graphic object as another graphic leaf in the batch (block 806). While traversing the graphic leafs corresponding to the vector object batch 208, for instance, the tessellation and replacement module 206 encounters a graphic leaf that represents the single object 212 and then a second graphic leaf that represents a same type of object, e.g., another square.

A metadata buffer is attached to the other graphic leaf of the batch (block 808). In accordance with the principles discussed herein, the metadata buffer includes information that describes how to transform the graphic object represented by the other graphic leaf to obtain the graphic object represented by the determined leaf. By way of example, the tessellation and replacement module 206 attaches a metadata buffer to the graphic leaf that represent the single object 212, e.g., attaches the type 1—metadata buffer 218. The determined graphic leaf is removed from the graphic tree (block 810). By way of example, the tessellation and replacement module 206 removes from the vector graphics tree 202 the graphic leaf determined at block 806, e.g., the graphic leaf that represents the second encountered square.

The image is rendered according to the graphic tree without the removed graphic leaf and by leveraging the attached metadata buffer (block 812). By way of example, the GPU 122 renders the image according to the vector graphics tree 202, which has had at least one graphic leaf removed at block 810. The GPU 122 renders the image in this way by leveraging the metadata buffer attached to the graphic leaf at block 808.

Having described example procedures in accordance with one or more implementations, consider now an example system and device that can be utilized to implement the various techniques described herein.

Example System and Device

Figure 9:
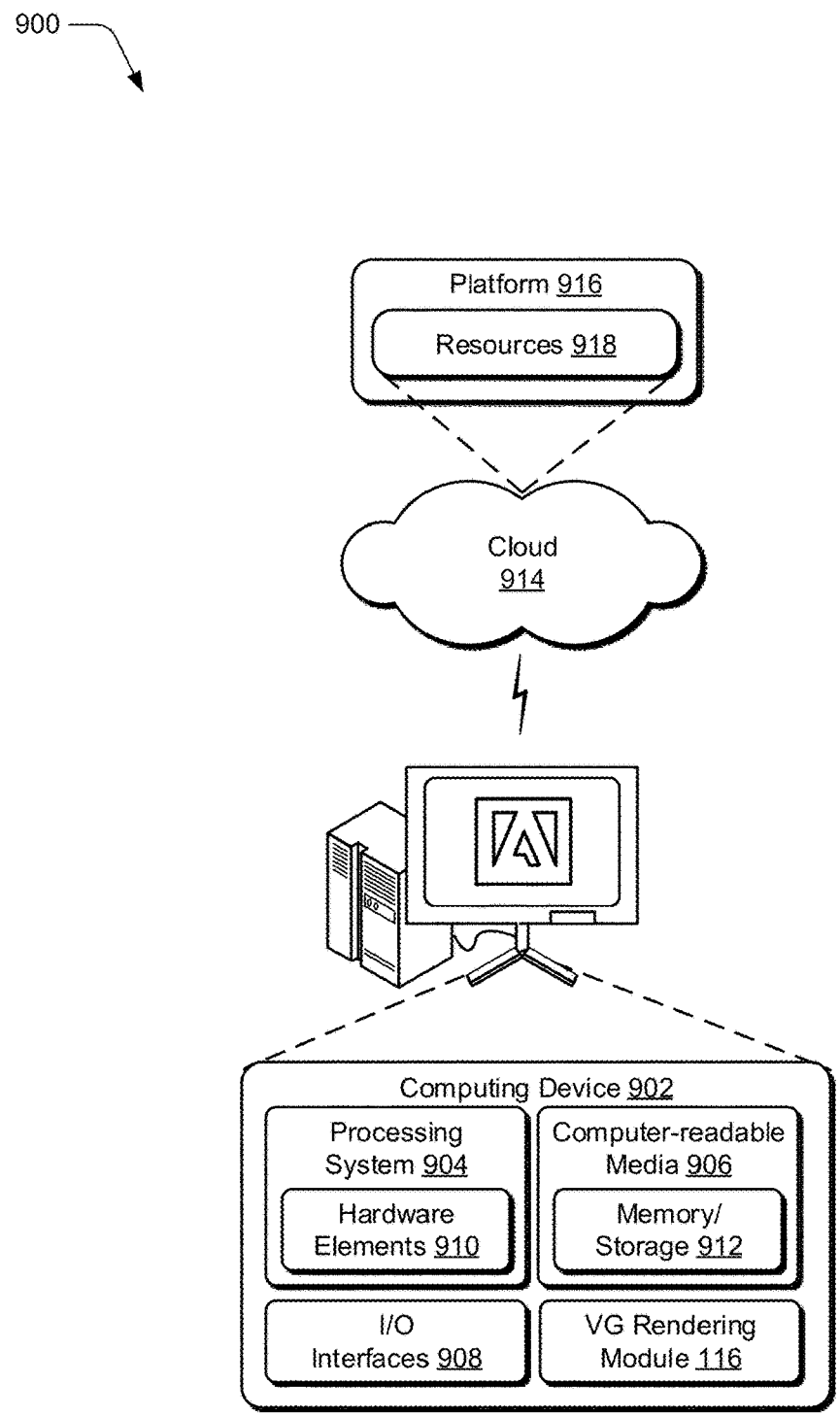
FIG. 9 illustrates an example system including various components of an example device that can be implemented as any type of computing device as described and/or utilized with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the vector graphics rendering module 116 (VG rendering module 116). The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. The processing system 904 may include the central processing unit 120 and the graphics processing unit 122, for instance. This may also include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to render an image on a graphics processing unit (GPU), a method implemented by a computing device, the method comprising:
   generating, by the computing device, groups of graphics objects depicted in the image such that the graphics objects of a group have a same object type;
   determining, by the computing device, transformations for the graphics objects of the group, the transformations describing how to transform a first graphics object of the group to obtain another graphics object of the group;

tessellating, by the computing device, the first graphics object of the group to generate a tessellated object;

generating, by the computing device, a metadata buffer for the group, the generated metadata buffer including information indicative of the determined transformations; and rendering, by the computing device, the image on the GPU, in part, by providing, for each of the groups of graphics objects, a respective tessellated object and a respective generated metadata buffer to the GPU for rendering.

2. A method as described in claim 1, wherein the other graphics objects of the group are not tessellated.

3. A method as described in claim 1, wherein a determined transformation is an affine transformation of the first graphics object of the group to obtain the other graphics object of the group.

4. A method as described in claim 1, wherein the object type comprises a shape.

5. A method as described in claim 1, further comprising rendering a first group of the graphics objects having a first object type before rendering a second group of the graphics objects having a second object type, the first and second groups of graphics objects being rendered, in part, by providing the GPU the respective tessellated object and the respective generated metadata buffer for the first and second object types.

6. A method as described in claim 1, further comprising determining a depth for each of the graphics objects depicted in the image, the depths being relative, one graphics object to another.

7. A method as described in claim 6, wherein the generated metadata buffer further includes information indicative of the determined depths of the graphics objects of the group.

8. A method as described in claim 7, wherein the rendering includes the GPU determining whether a rendered graphics object overlaps a current graphics object being rendered based on the determined depths.

9. A method as described in claim 8, further comprising:
discarding a portion of the current graphics object responsive to a determination that the rendered graphics object overlaps the current graphics object; and
rendering the current graphics object without the discarded portion.

10. A method as described in claim 1, further comprising:
generating a graphic tree indicative of a rendering order for the image, the graphic tree including graphic leafs that each represent a graphics object depicted in the image; and
generating batches of the graphic leafs according to one or more predefined rules.

11. A method as described in claim 10, wherein the groups are generated for each of the batches.

12. A method as described in claim 10, further comprising:
attaching to a graphic leaf representative of the first graphics object of the group the generated metadata buffer for the group; and
removing from the graphic tree the graphic leafs representative of the other graphics objects of the group.

13. A method as described in claim 12, further comprising rendering the graphics objects in the rendering order indicated by the graphic tree.

14. A method as described in claim 1, wherein the image is a vector graphics image and the graphics objects are vector graphics objects.

15. A system comprising:
a graphics processing unit (GPU) configured to render images;
at least one central processing unit (CPU); and
memory having stored thereon computer-readable instructions that are executable by the at least one CPU to perform operations comprising:
tessellating, for a plurality of graphics objects depicted in an image having a particular object type, one of the graphics objects to generate a single tessellated graphics object;
generating a metadata buffer, the metadata buffer including information describing how to transform the single tessellated graphics object to obtain the other objects of the plurality of graphics objects; and
rendering the image with the GPU by providing the single tessellated graphics object and the metadata buffer to the GPU.

16. A system as described in claim 15, further comprising a drawing application, wherein the tessellating, the generating, and the rendering are effective to render the image at a frame rate that enables display in real-time of a change made via the drawing application to a graphics object of the image.

17. A system as described in claim 15, wherein the operations further comprise generating a respective tessellated graphics object and metadata buffer for multiple different types of graphics objects.

18. A system as described in claim 15, wherein tessellations are not generated for the other objects of the plurality of graphics objects.

19. In a digital medium environment to render an image, a method implemented by at least one graphics processing unit (GPU) of a computing device, the method comprising:
rendering, by the GPU, graphics objects of a first type depicted in the image based on a single tessellated object of the first type and a metadata buffer that includes information describing how to obtain other graphics objects of the first type from the single tessellated object of the first type;
extracting, by the GPU, depth values from the metadata buffer for the first type and additional depth values from a metadata buffer for at least one subsequent type of graphics objects;
determining, by the GPU, that the rendered graphics objects overlap a graphics object of the at least one subsequent type in the image based on the extracted depth values; and
rendering, by GPU, the graphics object of the at least one subsequent type without a portion determined to be overlapped by the rendered graphics objects, the graphics object of the at least one subsequent type being rendered based on a respective tessellated object of the at least one subsequent type and the metadata buffer for the at least one subsequent type.

20. A method as described in claim 19, further comprising obtaining by the GPU from a central processing unit (CPU) the tessellated objects of the first and at least one subsequent type and the metadata buffers for the first and at least one subsequent type.

* * * * *